April 23, 1963   J. H. LIEBENTHAL   3,086,613
WIPING BAR FOR TRACK LUBRICATOR
Filed July 20, 1959   2 Sheets-Sheet 1

INVENTOR
JOHN H. LIEBENTHAL
BY
ATTORNEY

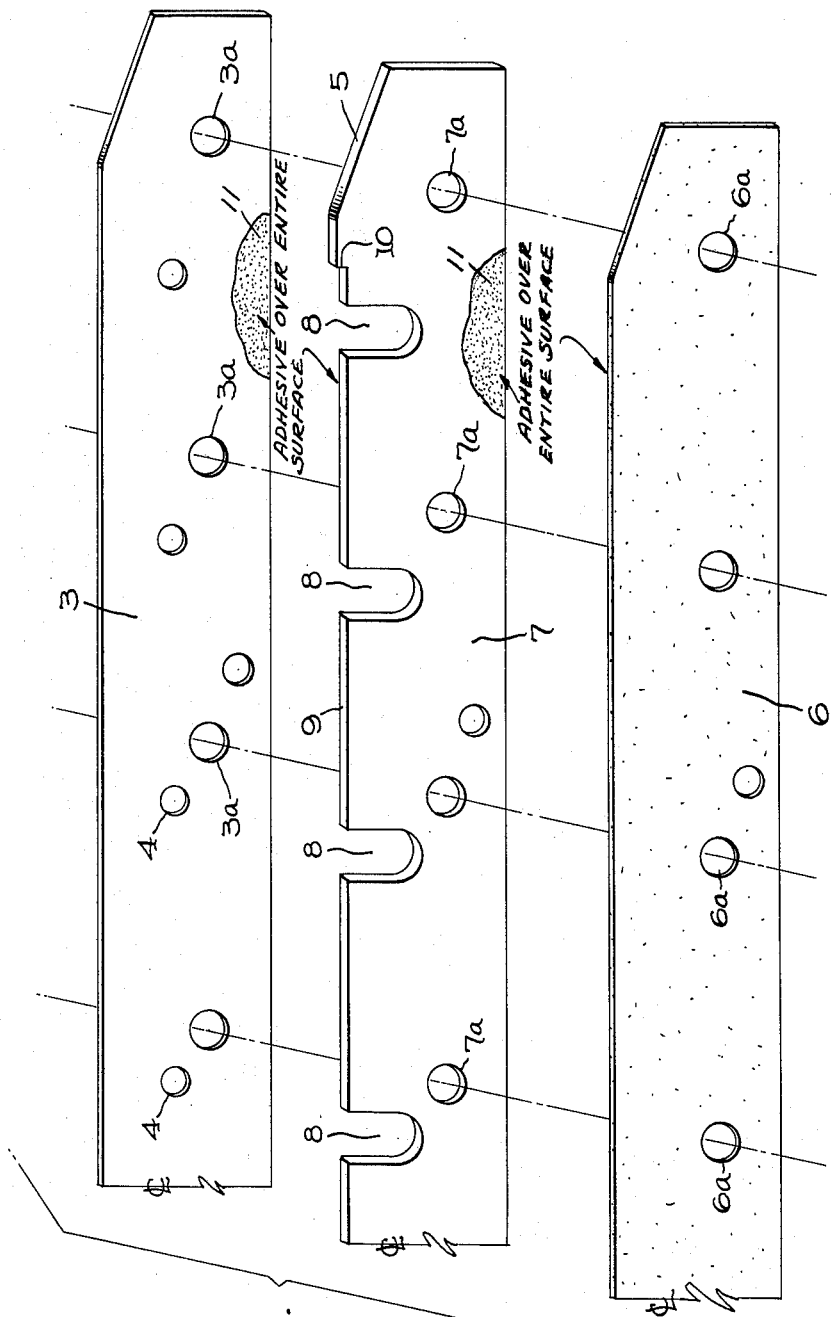

United States Patent Office 3,086,613
Patented Apr. 23, 1963

3,086,613
WIPING BAR FOR TRACK LUBRICATOR
John H. Liebenthal, Chicago, Ill., assignor to Poor & Company, Chicago, Ill., a corporation of Delaware
Filed July 20, 1959, Ser. No. 828,197
2 Claims. (Cl. 184—3)

This invention relates to an improved wiping bar for railway track lubricators.

As well understood in the art, the wiping bar is a grease distribution element whose upper edge is placed at the gauge side of the rail so that passing wheels will pick up grease and lubricant at the gauge sides of the rails particularly on curves. Heretofore, the wiping bar has always presented a critical problem from the standpoint of maintenance. Friction between the wheel flange and the wiping bar as well as the seizing of the steel bar on the wheels causes the bar to be subjected to considerable wear and often deformation resulting from wheel flange abuse. In an effort to minimize such abuse in the past, the wiping bar assembly has been usually made of several steel sections or plates of a thickness to withstand the wheel flange punishment. These sections have been bolted together to insure fluid tightness for the grease passages, and since outer section bore the brunt of wheel batter it was made thicker than the other sections with the result that the wiping bar assembly is unnecessarily thick and consequently occupied much, in fact too much, of the space between the wheel flanges and the rail, even when the rail and wheels were new. As wear occurs between the wheels and rail this space is reduced and the wiping bar assembly must withstand greater abuse.

Accordingly, the present invention has in view the provision of a wiping bar assembly wherein all of the several plates, for example, the exposed wiping plate, the intermediate grease passage plate and the normally concealed gasket plate, are made much thinner than heretofore and to secure maximum strength are bonded together by an adhesive of the epoxy resin type. Thus, the wiping bar assembly though made up of thin sections becomes a stiff, rigid, strong integrated structure and may be mounted with greater facility between the backing bar which fits into the fishing space of the rail and the duct bar at the inner side of the track and which connects with the lubricant storage tank.

Another object of the invention is to make the outer or wiping plate of non-metallic material, such for example, as an appropriate nylon type plastic, thereby providing a material which is softer than the flange of the car wheel and has a certain amount of resilience which will not unduly transmit wear to the wheel or to the assembly itself. Moreover, in view of the relative softness or resilience of the non-metallic outer wiping plate, the contacting of the wheel flange with the wiping bar assembly will have the effect of squeezing the grease from the duct outlets of the passage plate to assist in lubricating the wheel in addition to the pumping effect on the grease provided by the usual ramp engaged by the car wheels.

Another object of the invention is to provide a passage plate which is flanked by the wiping plate on the outside and the gasket plate on the inside with an upper edge which in the general zone of the outlets of the grease passage is recessed to provide a trough for grease thereby feeding to the wheel flanges, a line of grease, as distinguished from spaced spots of grease, as in the past. In that connection the end portions of the passage plate adjacent the ends of the recess provide shoulders which prevent grease running out from the ends of the assembly.

With the above and other objects in view which will appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 is a diagrammatic view of a wiping bar unit according to the present invention shown in full lines and in position on a new rail serving a new car wheel where there is maximum initial space between the wheel flange and the gauge side of the rail also shown by full lines; the dotted lines representing present practice where the wiping bar assembly is relatively thick, and the wheel and rail have become worn.

FIGURE 2 is an exploded view of the wiping bar assembly including the outer wiping plate, the intermediate passage plate and the gasket plate, and illustrating the formation at the upper edge of the passage plate to provide a grease trough. The elements are symmetrical about the center line C—L.

Similar reference characters designate corresponding parts throughout the several figures of the drawing.

Figure 1:
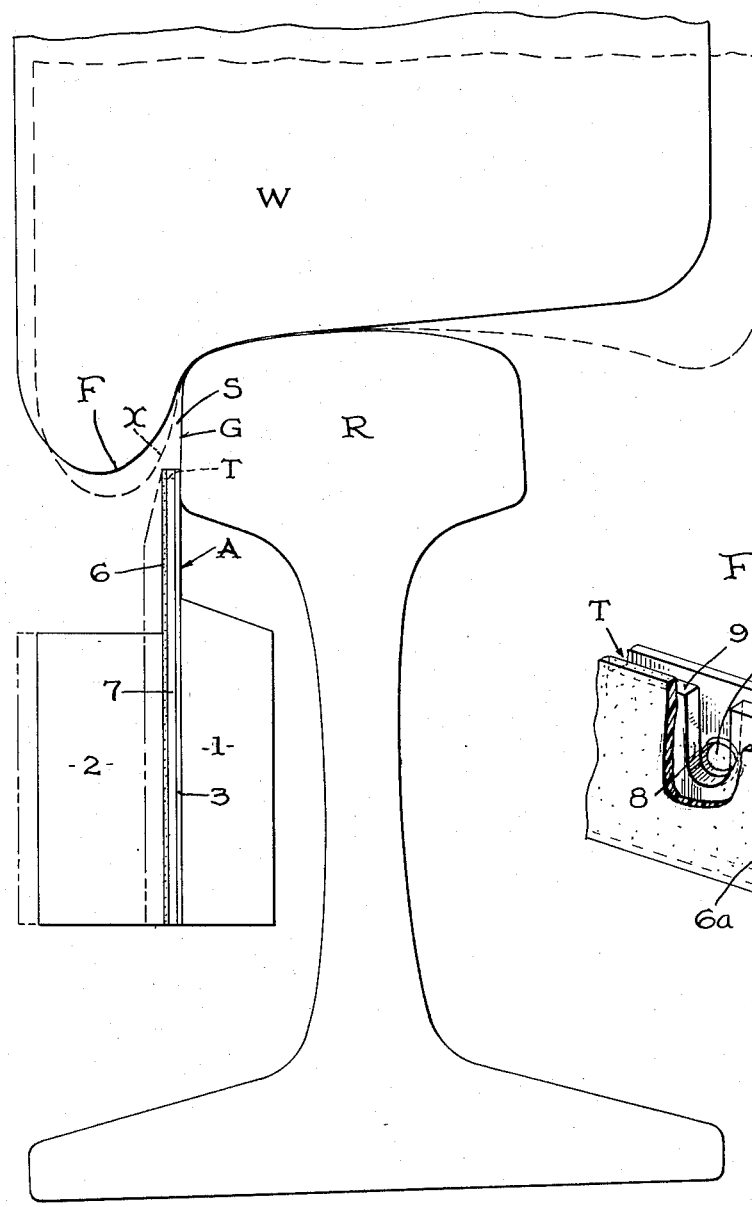
Figure 3:
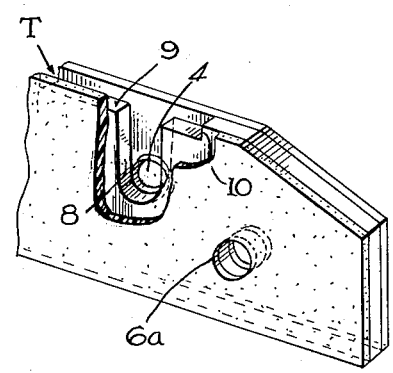
FIGURE 3 is a detail view further illustrating the manner of forming the elongated grease trough.

Referring to FIGURE 1 of the drawings, it will be observed that the head of the rail R supports the wheel W having flange F whose inner face is normally spaced from the gauge side G of the rail to provide a space S in which the upper portion of the wiping bar assembly projects.

With new rails and new car wheels, the top edge of the wiping bar assembly lies substantially in the horizontal plane of the lower crest of the arc of the flange F. As wear occurs between the wheel W and the head of the rail R, the inner edge of the flange F of the wheel moves inwardly as indicated by dotted line $x$ in FIGURE 1. This wear drops or lowers the wheel flange into a path that includes the wiping bar with consequent deformation and impairment of the grease feeding capacity of the entire assembly.

The new wiping bar assembly is designated generally as A and is supported and clamped to the gauge side of the rail by a backing bar 1 and a duct bar 2. This wiping bar assembly A includes a gasket plate 3 which is one of a plurality of lamina and lies next to the backing bar 1 and is provided with bolt holes 3ª and grease openings 4. This plate is of uniform vertical height throughout, from edge to edge, but its end portions are inclined as at 5 to register with similar inclined portions 5 of the wiping plate 6 and the intermediate passage plate 7. The wiping plate 6 may be made of thin steel or preferably a non-metallic material. To clamp the wiping bar assembly between the backing bar and the duct bar, the wiping plate 6 and passage plate 7 are provided with bolt holes 6ª and 7ª which register with the holes 3ª of the gasket plate.

The passage plate 7 is thicker than the plates 3 and 6 and is provided with substantially U-shaped slots 8 which open into elongated countersunk grease passages 4 in the gasket plate so as to supply grease from the tank (not shown) under pump pressure.

As will be seen from FIGURE 2, the upper edge portion 9 of the passage plate 7 is recessed or countersunk between the grease outlets 8 thereby providing end shoulders 10 at opposite ends of the plate which serve to block grease from running out the ends of the assembly, while, at the same time, providing a trough T in the final assembly which provides a linear type grease distribution port communicating with the passages 8. In that connection, it will of course be understood that the opposite sides of the plate 7 are bounded by the gasket plate 3 and the wiping plate 6 to form the edges of the trough.

The contacting faces of the plates 3, 6 and 7 are bonded together by an adhesive 11 of the epoxy resin type thereby not only forming a stiff, strong integrated wiping bar which can be prefabricated as a unit in the plant, but also because of such integration makes it possible to substantially reduce the thickness of the entire wiping bar assembly and install the prebonded parts as a unit. This avoids time and labor at the point of installation.

As previously indicated, the wiping plate 6 is preferably made of non-metallic material, such for example, as a nylon type plastic which presents an antifriction surface having a certain amount of resiliency which will not only reduce wear on both the bar and the rail, but at the same time, permit of a squeezing action by the wheel flange and the gauge side of the rail to discharge a more uniform grease coating on the wheel flange.

I claim:

1. As an article of manufacture, a prefabricated wiping bar assembly for mounting at the gauge side of a railway rail and of a thickness to fit within the calculated maximum and minimum space between said gauge side and the flanges of passing car wheels when both rail and car wheels are new and when they have ultimately received maximum wear, said article comprising outer and inner laminae whose total thickness is less than said minimum space and said inner lamina having means for passing grease to the said gauge side of the rail; the lamina exposed to the wheel flange being a nylon type material having inherent lubricous properties and backed up by a metal lamina, and a thermosetting resin bonding the contacting faces of the laminae together and constituting a permanent structural element in the article to provide a rigid stiff wiping bar capable of being handled as a unit from the time of manufacture to the point of installation.

2. As an article of manufacture, a prefabricated wiping bar assembly for mounting at the gauge side of a railway rail and of a thickness to fit within the calculated maximum and minimum space between said gauge side and the flanges of passing car wheels when both rail and car wheels are new and when they have ultimately received maximum wear, said article comprising outer and inner laminae whose total thickness is less than said minimum space and said inner lamina having means for passing grease to the said gauge side of the rail; all of said laminae being of the same width and length, the inner lamina being recessed for a portion of its length to provide a continuous grease channel closed inwardly of the end of the terminal portions of said intermediate lamina by shoulders which prevent grease spilling over the ends of the assembled lamina, and a thermosetting resin bonding the contacting faces of the laminae together and constituting a permanent structural element in the article to provide a rigid stiff wiping bar capable of being handled as a unit from the time of manufacture to the point of installation.

References Cited in the file of this patent
UNITED STATES PATENTS

| | | |
|---|---|---|
| 2,124,866 | Young | July 26, 1938 |
| 2,230,657 | Stern | Feb. 4, 1941 |
| 2,555,615 | Stern | June 5, 1951 |
| 2,772,197 | Kozdemba | Nov. 27, 1956 |
| 2,865,692 | Gossmann | Dec. 23, 1958 |
| 2,884,093 | Stewart | Apr. 28, 1959 |
| 2,907,410 | Stokes | Oct. 6, 1959 |